(12) United States Patent
Farley et al.

(10) Patent No.: US 7,483,706 B2
(45) Date of Patent: *Jan. 27, 2009

(54) FLOATING IP ADDRESS FOR ROAMING INTERNET CONNECTED SUBSCRIBER UNITS

(75) Inventors: Kevin Farley, Palm Bay, FL (US); Thomas Gorsuch, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/593,359

(22) Filed: Nov. 6, 2006

(65) Prior Publication Data

US 2007/0049294 A1    Mar. 1, 2007

Related U.S. Application Data

(63) Continuation of application No. 10/820,534, filed on Apr. 8, 2004, now Pat. No. 7,133,684, which is a continuation of application No. 09/328,663, filed on Jun. 9, 1999, now Pat. No. 6,725,047.

(51) Int. Cl.
 *H04Q 7/20* (2006.01)
(52) U.S. Cl. ............... 455/456.1; 455/414.1; 455/432.3
(58) Field of Classification Search .............. 455/456.1, 455/432.3, 414.1, 445, 433, 446, 447, 422.1, 455/432.1, 412.1; 370/329, 331, 389, 401; 709/242, 245, 249
See application file for complete search history.

(56) References Cited

U.S. PATENT DOCUMENTS

| | | | |
|---|---|---|---|
| 5,325,362 A | 6/1994 | Aziz | |
| 5,400,338 A | 3/1995 | Flammer, III | |
| 5,594,731 A | 1/1997 | Reissner | |
| 5,708,655 A | 1/1998 | Toth et al. | |
| 5,905,773 A * | 5/1999 | Wong | 379/88.03 |
| 6,141,347 A | 10/2000 | Shaughnessy et al. | |
| 6,256,300 B1 | 7/2001 | Ahmed et al. | |
| 6,304,753 B1 | 10/2001 | Hartmaier | |
| 6,434,134 B1 * | 8/2002 | La Porta et al. | 370/338 |
| 6,449,272 B1 | 9/2002 | Chuah et al. | |
| 6,484,211 B2 | 11/2002 | Turunen | |
| 6,549,786 B2 | 4/2003 | Cheung et al. | |
| 6,701,361 B1 * | 3/2004 | Meier | 709/224 |
| 6,711,146 B2 | 3/2004 | Yegoshin | |

FOREIGN PATENT DOCUMENTS

EP     0 483 547 A1    5/1992

(Continued)

OTHER PUBLICATIONS

Solomon, James D., "Mobile IP The Internet Unplugged," (*N.J.: Prentice Hall PTR*), pp. 47-60 (1998).

(Continued)

*Primary Examiner*—Jean A Gelin
(74) *Attorney, Agent, or Firm*—Volpe and Koenig, P.C.

(57) ABSTRACT

A system apparatus for wireless communication that includes receiving, receiving data for a subscriber, determining the subscriber to whom the data is addressed, determining which cell the subscriber currently resides, and transmitting the data accordingly.

6 Claims, 5 Drawing Sheets

FOREIGN PATENT DOCUMENTS

EP            0 486 547        5/1992

OTHER PUBLICATIONS

Cohen, Danny, et al., "IP Addressing and Routing in a Local Wireless Network," *Proceedings of the IEEE Infocom '92 Conference on Computer Communications*, Florence, Italy, May 4-8, 1992, vol. 2, pp. 0626-0632, XP000300088.

Droms, R., "Dynamic Host Configuration Protocol," *Network Working Group, Request For Comments (RFC)* 2131, (Mar. 1997) XP002149764.

Johnson, David B., et al., "Protocols for Adaptive Wireless and Mobile Networking," *IEEE Personal Communications*, vol. 3, No. 1, pp. 34-42 (Feb. 1996) XP000554691.

Perkins, Charles E., et al., "DHCP for Mobile Networking with TCP/IP" *Proceedings of The IEEE Symposium On Computers And Communications*, Alexandria, Egypt, Jun. 27-29, pp. 255-261 (1995) XP002132695.

Perkins, Charles E., et al., "Using DHCP With Computers That Move" *Wireless Networks*, October, vol. 1, pp. 341-353 (1995) XP000538245.

Cohen et al., "IP Addressing and Routing in a Local Wireless Network," Proceedings of the IEEE Infocom '92 Conference on Computer Communications, vol. 2, pp. 626-632, XP000300088 (May 4-8, 1992).

Droms, "Dynamic Host Configuration Protocol," Network Working Group, Request for Comments (RFC) 2131, XP002149764 (Mar. 1997).

Johnson et al., "Protocols for Adaptive Wireless and Mobile Networking," IEEE Personal Communications, vol. 3, No. 1, XP000554691, pp. 34-42 (Feb. 1996).

Cohen, Danny, et al., "IP Addressing and Routing in a Local Wireless Network," *Proceedings of the IEEE Infocom '92 Conference on Computer Communications, Florence, Italy*, May 4-8 (1992,) vol. 2, pp. 0626-0632, XP 000300088.

Droms, R., "Dynamic Host Configuration Protocol," *Network Working Group, Request For Comments (RFC) 2131*, (Mar. 1997) XP002149764.

Johnson, David B., et al., "Protocols for Adaptive Wireless and Mobile Networking," *IEEE Personal Communications*, vol. 3, No. 1, pp. 34-42 (Feb. 1996) XP0000554691.

Perkins, Charles E., et al., "DHCP for Mobile Networking with TCP/IP" *Proceedings of The IEEE Symposium On Computers And Communications, Alexandria, Egypt*, June 27-29, pp. 255-261 (1995) XP002132695.

Perkins, Charles E., et al., "Using DHCP With Computers That Move" *Wireless Networks*, October, vol. 1, pp. 341-353 (1995) XP000538245.

* cited by examiner

FLOATING IP ADDRESS FOR ROAMING INTERNET CONNECTED SUBSCRIBER UNITS

RELATED APPLICATIONS

This application is a continuation of U.S. application Ser. No. 10/820,534, filed Apr. 8, 2004 now U.S. Pat. No. 7,133,684 which is a continuation of U.S. application Ser. No. 09/328,663, filed Jun. 9, 1999, now U.S. Pat. No. 6,725,047. The entire teachings of the above applications are incorporated herein by reference.

The present invention relates to a wireless communication system. In particular, the present invention relates to using a floating address for use in roaming network service.

BACKGROUND

The present invention provides an addressing protocol for use in a wireless computer network in which a subscriber is assigned a network address based upon an original location in the network. As the subscriber moves throughout the network, data for the subscriber is routed to a cell site server at the subscriber's original location. The cell site server determines whether the subscriber is located in the original cell site, in which case it causes the data to be transmitted to the subscriber over a wireless link, or whether the subscriber has moved to a location serviced by a second cell site server. In the latter case, the first cell site server causes the data to be tunneled to the second cell site server.

To connect to the Internet, every terminal requires an Internet Protocol (IP) address that uniquely identifies the node's point of attachment to the Internet. In other words, a node must be located on the network as indicated by its IP address to receive data destined to it; otherwise, data destined to the node would be undeliverable. IP network address allocation and administration have historically assumed that there is a close relationship between a computer's IP address and its physical location.

In a wireless communication network, however, a subscriber can travel between various cells, thereby receiving transmissions from a variety of base stations. The transmissions are handed off from one base station to another as the subscriber travels from one cell to another. If such a system were to be attempted for Internet routing, when a terminal connects to the Internet while in a particular cell, the base station in that cell connects to a server that provides the IP address for the mobile unit. As the terminal moves through the geography and approaches another base station, a handoff is performed. That is, the transmission between the terminal and the base station is handed off to another base station. This other base station is now responsible for routing data packets.

Of course, moving across a network creates addressing problems that are peculiar to the mobile environment. Specifically, as a terminal moves from point to point on a network, the network must somehow know where the terminal is located so that data packets can be delivered to the terminal. If the terminal requests data in one cell, for example, and travels to another cell, the network must know the terminal's present location so that data packets can be accurately delivered. Unfortunately, because a base station in a first cell may not be in direct communication with a base station in a second cell, traffic can be lost during a handoff. Thus, when a handoff occurs, a terminal's connection to the Internet can get dropped because the new base station does not know the terminal's IP address for data exchange with the Internet.

To account for this addressing problem in the current art, if one connects to the Internet in a mobile environment, a technique called Mobile IP is used. This Mobile IP is a modification to IP that allows nodes to continue to receive data no matter where they happen to be attached to the Internet.

Internet nodes typically use the IP address of a destination node when searching for connections to that destination. Thus, the IP address of a remote endpoint also serves to identify the endpoint. For mobile computers, a destination network is known as the home network. Since the mobile node appears to the rest of the Internet as if it were actually located on the home network, it can be called the home address of the mobile node. If the source of the packet is assumed to be an Internet node with no special modification for mobility support, the source will be unaware whether anything special happens when a packet arrives at the home network.

If, however, the mobile node is not directly attached to its home network, then the packet requires a "care of" address to find the next node. Because the packet can only follow the mobile node by utilizing the existing Internet infrastructure for the intervening hops, Mobile IP changes the data's address scheme so that a packet is able to follow the mobile node off the home network. This operation of changing the address of the packet for further routing is known as readdressing. The operation of readdressing a packet transforms its original destination IP address, the home address that identifies the mobile node, into a different destination IP address, namely, the care-of address, which locates the mobile node.

Additionally, for supporting mobility, the inverse of the readdressing function must be performed. That is, if one agent applies an address translation function to a packet destined for a mobile node, the inverse function should be provided so that the nodes with which it corresponds can operate in a symmetrical manner. Otherwise, the mobile node's home address, identifying the higher-level protocol connection status control blocks, would not be available in the same way as expected by the node that originally sent the packet. Typically, higher-level protocols do operate in this symmetric fashion.

The care-of address is used in lieu of an IP address, but requires a new set of protocols and modifications to the existing network stack.

Because of the need for a care-of address, a central location must be maintained that collects all traffic to be forwarded. Additionally, modifications must be made to network components and the existing network stack. Furthermore, a new set of protocols are required to employ Mobile IP. None of these alternatives are optimal, given the severe scaling problems that are especially relevant considering the explosive growth in mobile computers.

Thus, a need exists in the current state of the art for a mobile network that does not require substantial modifications to the existing network components and protocols.

SUMMARY OF THE INVENTION

To alleviate the problems inherent in the prior art, systems and methods are introduced that allow for roaming subscribers to send and receive data on a network in a direct way.

In one embodiment of the present invention, data for a subscriber is received in a first cell. Using a wired-network address in the received data, the intended subscriber is identified, and once the subscriber is identified, it is determined whether the data was received via a tunnel on a backhaul network. If the data was received via the tunnel, then the wireless-network identifier of the subscriber is retrieved, and the data is sent to the subscriber. If the data was not received via a tunnel, it is determined whether the subscriber is presently located in the first cell if the subscriber has traveled to a second cell. If the subscriber is located in the first cell, the wireless-network identifier is retrieved from a database, and using this identifier, the data is transmitted to the subscriber. If the subscriber is not located in the first cell, the cell site in which the subscriber is presently located is identified, and the data is sent via a tunnel to that cell.

The subscriber's wired-network address can be requested from an address server. The address server identifies the originating cell site of the wired-network address, and an unoccupied address that is associated with the originating cell site is assigned to that subscriber. If the wired-network address expires, or is near expiration, a request is received to renegotiate the wired-network address lease. The address server then determines the present location of the subscriber. If the subscriber is not in the same call site as when it received its present address, the present cell site is identified, the request is denied, and a new wired-network address is assigned to the subscriber. This new wired-network address is associated with the cell site in which the subscriber currently resides.

In other embodiments, the invention concerns techniques for providing wireless communication by transmitting, from a wireless station, a request for a wired network address to a first cell cite over the wireless network. The cell site then responds by forwarding an address request to an address server, the request being a request to assign a wired network address to the wireless station. The address server then returns a wired network address for the wireless station. The first cell site stores information associating the wired network address with the first wireless station, to permit subsequent determination of whether the first wireless station is located in the cell site by matching of the wired-network address to the first wireless station.

Optionally, the the assigned wired network address is then used by the first wireless station when communicating with the wired network via the first cell site.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention relates to a wireless communication system. In particular, the present invention relates to a roaming network service.

Figure 1:
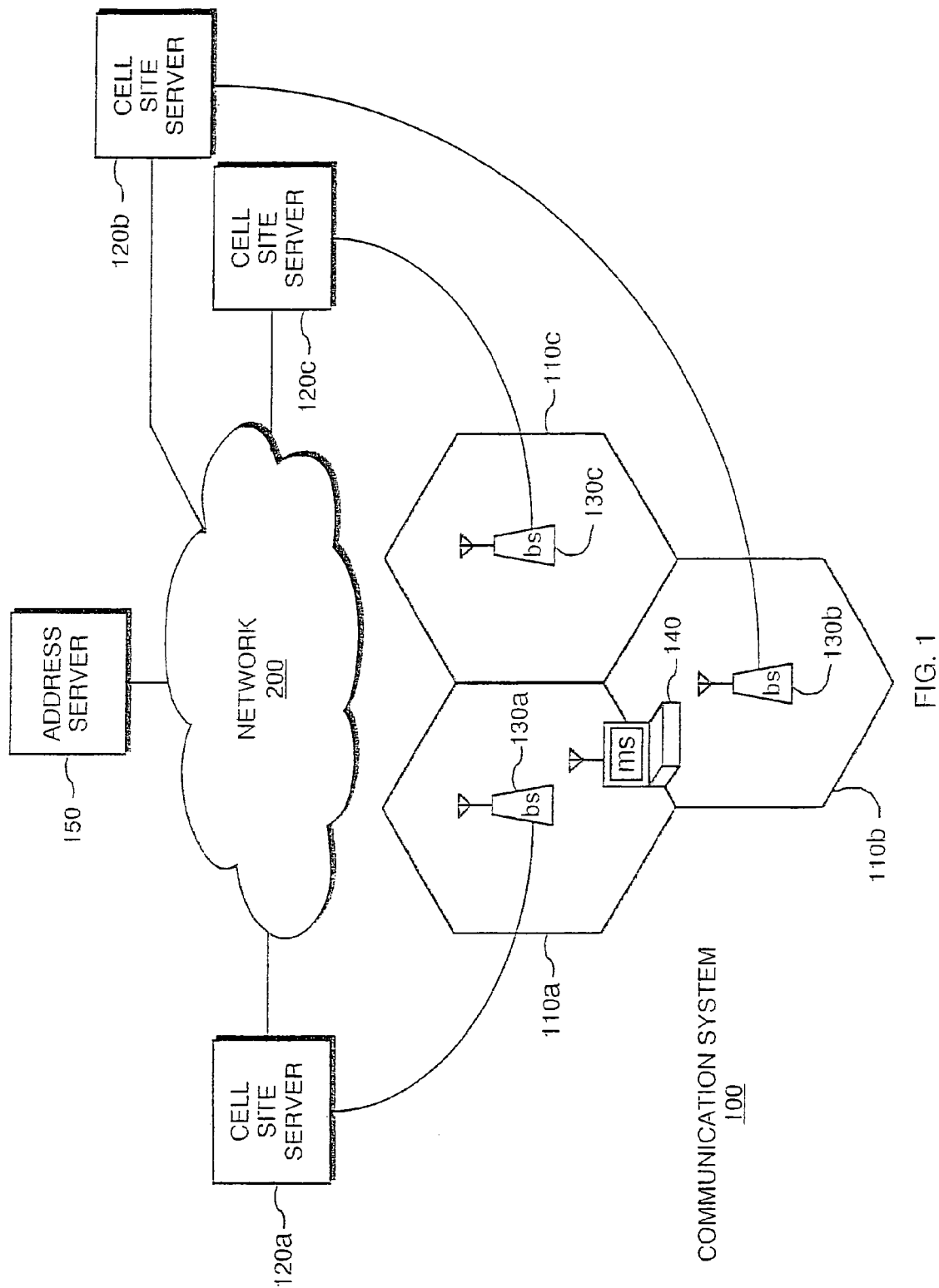
FIG. 1 is a system overview of an embodiment of the present invention depicting a wireless network including base stations, an address server, and a mobile terminal.

FIG. 1 is a block diagram illustrating a communication system constructed in accordance with an embodiment of the present invention. The communication system 100 can be populated by a plurality of cell sites 110a-110n covering the geographic area of the communication system 100. The number and layout of cell sites typically is determined by conventional design criteria beyond the scope of this invention, such as the size and topology of the geographic area to be covered by the communication system and the number of users to be satisfied by the system. The cell sites 110a-110c, depicted in FIG. 1, each can include a cell site server 120a-120c, and a cell site base station transmitter 130a-130c.

The communication system 100 can be adapted to communicate with a computer network 200 such as the Internet. Each cell site server 120a-120c is associated with a predetermined number of network addresses that are relevant to data routing functions that can be performed by the computer network 200. For example, in an Internet application, a cell site server 120a can be associated with a predetermined number of IP addresses. One of the addresses is associated with a "tunnel" function described herein. The other addresses can be associated with subscribers on a dynamic basis. The cell site servers 120a-120c can be provided in direct communication with the computer network 200 as shown in FIG. 1, or alternatively, can communicate with routing equipment or the like (not shown) provided in the communication system 100.

The communication system can include a plurality of mobile stations 140. The mobile stations 140 can communicate selectively with the base stations 130a-130c of the communication system 100 over radio frequency communication links using, for example, Code Division Multiple Access (CDMA) transmissions. As the name implies, the mobile stations 140 can migrate 7 throughout the cell sites 110a-110c of the communication system 100.

The communication system 100 also can include an address server 150. The address server 150 contains in memory a table of the various network addresses of the cell site servers 120a-120c. An example of an address server 150 is a DHCP server. The address server 150 can communicate directly with the computer network 200 as shown in FIG. 1, or alternatively, can communicate to routing equipment or the like (not shown) provided as part of the communication system 100.

Figure 2:
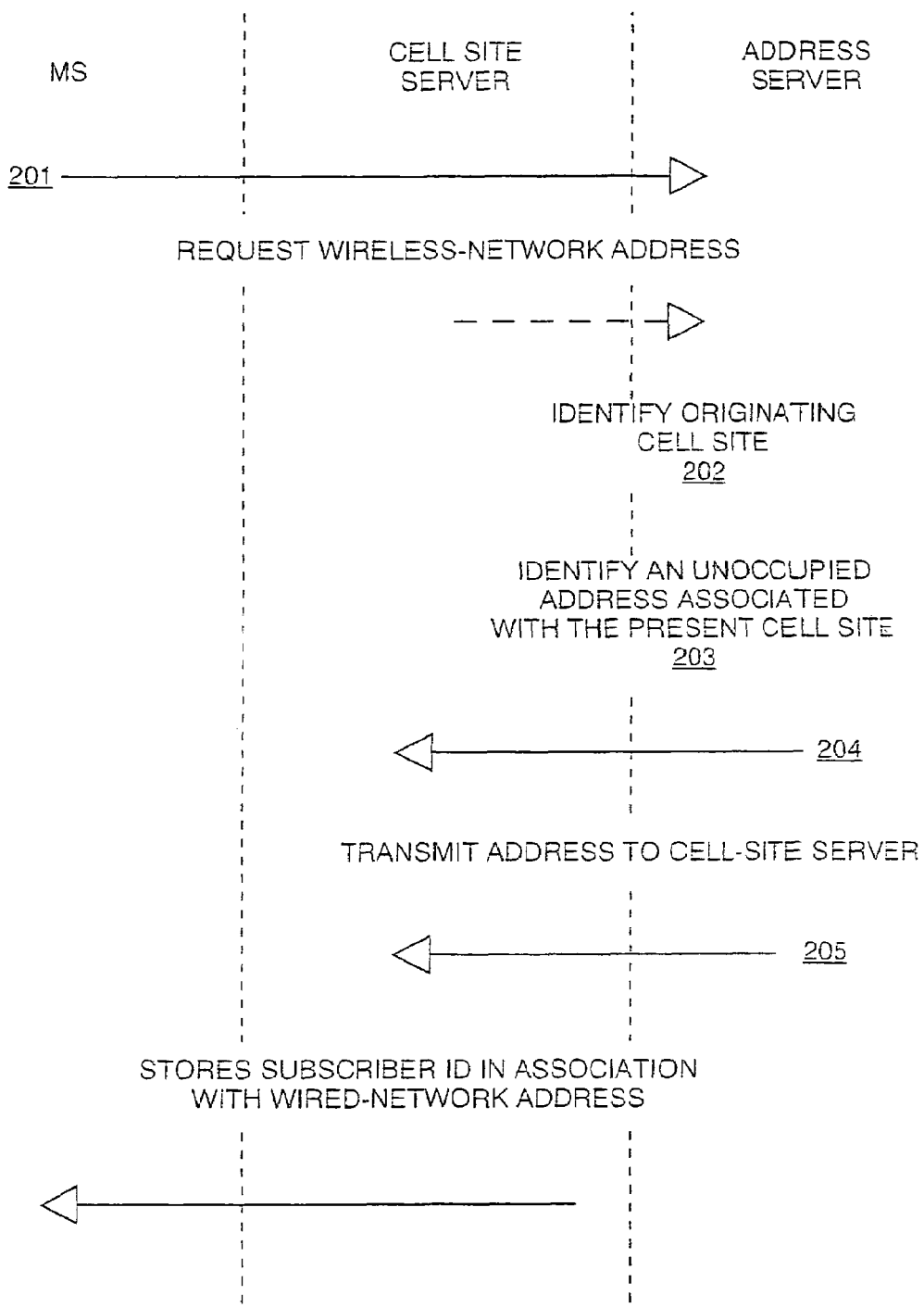
FIG. 2 is a flow diagram depicting an overview of a method of practicing an embodiment of the present invention.

FIG. 2 is a flow chart depicting a method of assigning a wired-network address according to an embodiment of the present invention. The mobile station transmits a request for a wired-network address to the address server (step 201). Typically, the mobile station includes in the request an identifier of the cell site 110a in which the mobile station is located. The mobile station can obtain the identifier from the cell site base station 130a as a preliminary part of a registration process. Alternatively, the cell site server 120a can transmit the request to the address server 150 requesting an assignment of a network address for the mobile station.

At step 202, the address server identifies, from its database, an unoccupied address associated with the originating cell site. At step 203, the address server marks the address as in use, and at step 204, the address server 150 transmits the address to the cell-site server, identifying it as being assigned to the subscriber. The cell-site server 120a then stores information associating this wired-network address with a specific subscriber at step 205.

After the address is assigned to a subscriber, the subscriber can roam the network, being handed off from one base station to another as the subscriber travels from one cell to the next. At an appropriate time in the roaming, the mobile station communicates with a second cell site server. This communication can include telling the second cell-site server the mobile station's wired network address, or a wireless-network identifier such as an electronic serial number (ESN).

Figure 3:
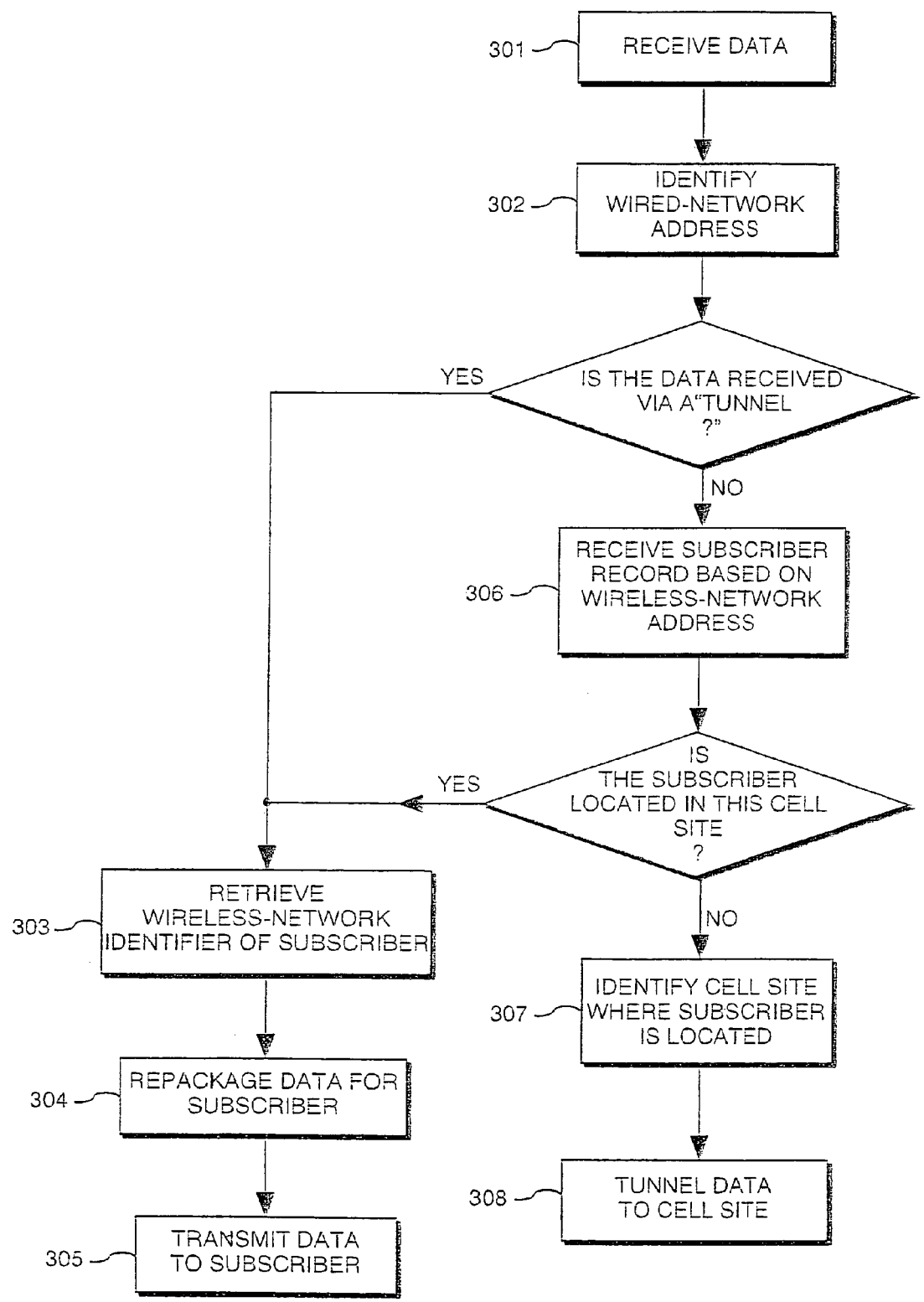
FIG. 3 is a flowchart that describes a method of practicing at least one embodiment of the present invention.

FIG. 3 is a flow chart of a method of operating a cell site server according to an embodiment of the present invention. When data is received at a cell-site server (step 301, the server determines whether the data was received via a tunnel in a backhaul network (step 302). The cell site server 120a can determine whether the data was tunneled to it by examining the network address that was used by the computer network 200 to route data to the server 120a. If the address is the tunnel address, then the data was received via a tunnel. Otherwise, the data was not received via a tunnel.

If the data was received via a tunnel, then at step 303, the cell site server 120a retrieves a wireless-network identifier for the intended subscriber, and repackages the data (step 304) for transmission to the subscriber. For example, the wireless-network identifier can be an electronic serial number (ESN). (The invention is not, however, limited to the use of an ESN; any suitable identifier can be used.) At step 305, the cell site server routes the data to the base station for transmission to the subscriber.

If at step 303 the data was not received via a tunnel, then at step 306, the intended subscriber's record is received from a database, and the cell site server determines whether the mobile station is in the cell site of the cell site server 120a. If the subscriber is presently located in the cell site of cell site server 120a (i.e., the cell that is serviced by the cell-site server), then at step 303, the subscriber's wireless-network identifier is retrieved, the data is repackaged for transmission by a base station at step 304, and is routed to the base station for transmissions to the subscriber at step 305.

If the subscriber is not presently located in the cell serviced by the cell-site server, then at step 307, using the subscriber's record, the cell site server retrieves a tunnel address of a cell site server 120b associated with the mobile station. The cell site server 120a repackages data for the cell site server 120b and tunnels it using the tunnel address.

It should be understood that FIG. 3 is not intended to imply an order to the method or to the claims. Rather, the method and claims can be understood in any order that is practicable. For example, in FIG. 3, the determination as to whether the data is received via a tunnel (between steps 302 and 303 in FIG. 3) can be interchanged with the determination as to whether the subscriber is located in the first cell site (located between steps 306 and 307 in FIG. 3).

Figure 4:
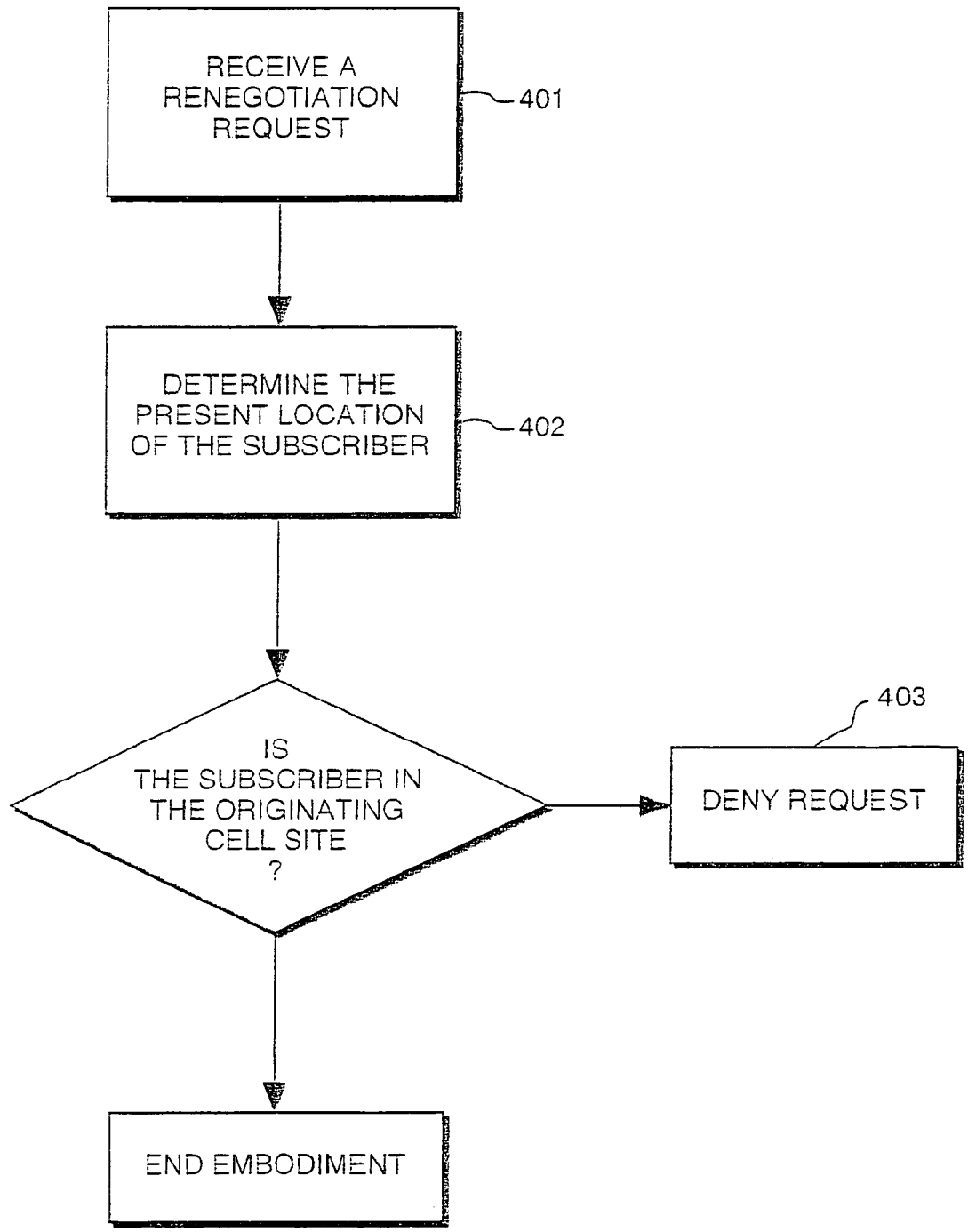
FIG. 4 is a flowchart that describes a method of practicing another embodiment of the present invention.

FIG. 4 is a flow chart depicting an embodiment of the present invention in which a wired-network-lease is renegotiated. At step 401, a renegotiation request is received at the address server. At step 402, the present location of the subscriber is determined. This step can be performed by the address server storing in a database a record of where the subscriber was when the wired-network address was assigned (the originating cell site), and comparing that record to information received with the renegotiation request. For example, the renegotiation request can include some information from the subscriber's present cell-site server that tells the address server the subscriber's current cell site. This cell site can be compared to the subscriber's wired-network identifier. Because the address server knows the originating cell site for the wired-network identifier (because the wireless-network identifier was assigned based on the originating cell site), it can compare the present cell site to the originating cell site. If the two cell sites are different, the address server will know that the subscriber has been handed off from one cell site to another, and the request will be denied. Thus, at step 403, if the subscriber is not in the originating cell site, then the request is denied, and a new wired-network address is assigned. The address server can choose a wired-network address that reflects the current cell site of the subscriber.

Figure 5:
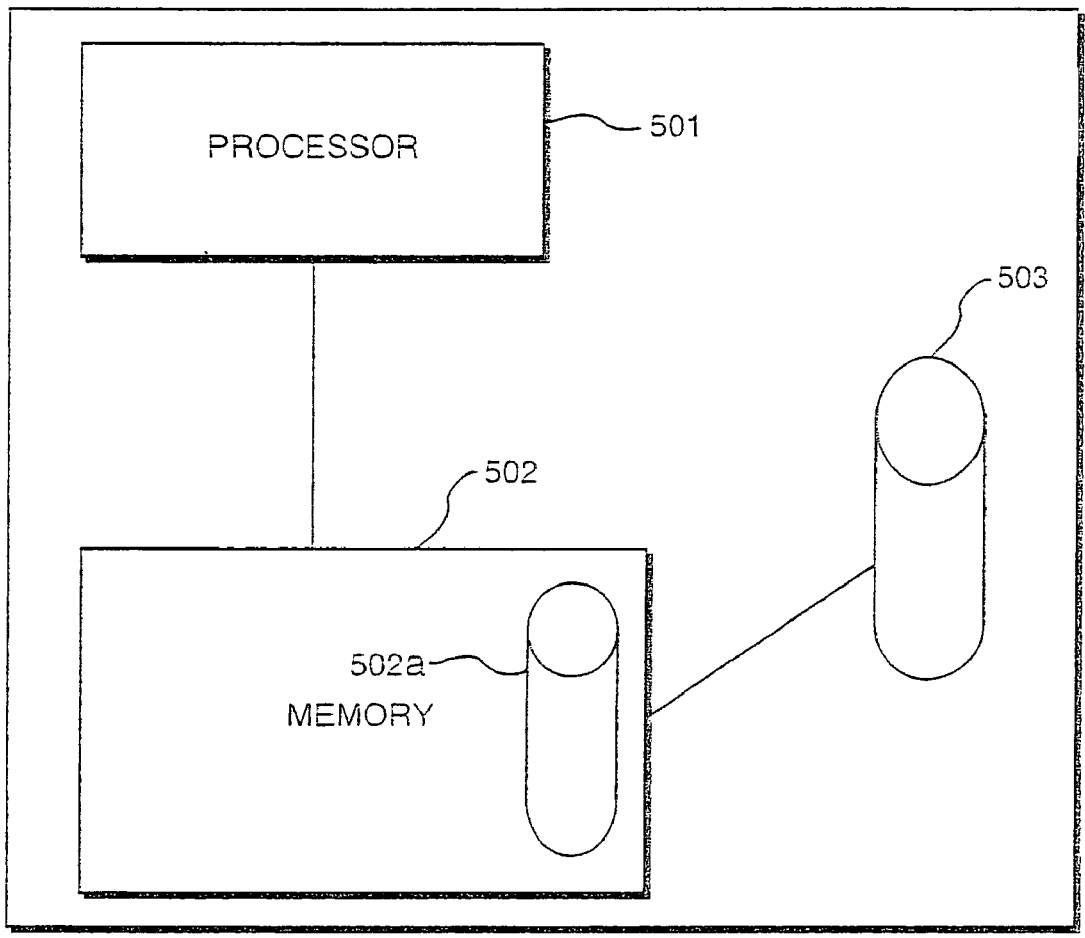
FIG. 5 is a block diagram of an apparatus according to an embodiment of the present invention.

FIG. 5 is a block diagram of an apparatus according to an embodiment of the present invention. This apparatus includes processor 501, and memory 502. Memory 502 includes database 502a that can associate the subscriber's wired network address with the subscriber's wireless network identifier. Memory 502 stores instructions adapted to be executed on processor 501 to perform a method embodiment of the invention. For example, memory 502 can store instructions adapted to be executed on processor 501 to receive data for a subscriber, determine the subscriber to whom the data is addressed, determine in which cell the subscriber currently resides, and transmit the data accordingly.

FIG. 5 can also include database 503, to which processor 501 or memory 502 can be coupled. Database 503 can include a predetermined number of wired network addresses, and can contain a database that associates a subscriber's wired-network address with a subscriber's wireless network identifier. Database 503 can also contain a database that associates a wired network address with a cell-site server.

For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing wireless communication comprising the steps of:
   receiving a request for a wire network address;
   forwarding a request to assign a wired network address to a wireless station;
   receiving the wired network address for the wireless station;
   storing data associating the wired network address with the wireless station;
   determining, based on the wired-network address, whether the subscriber is located in a certain cell site, wherein said determining step includes:
   retrieving a subscriber record;
   matching the wired-network address to the wireless station in the subscriber record; and
   transmitting the wired network address to the wireless station.

2. The method of claim 1 wherein the request for a wired network address includes an identifier for the first cell site.

3. The method of claim 1 wherein the wireless network identifier is an electronic serial number (ESN).

4. The method of claim 1 further comprising:
  if the subscriber is located in the certain cell site, sending the data, via a tunnel, to the certain cell site for wireless transmission.

5. The method of claim 4 further comprising the step of:
  receiving from the certain cell site, via a backhaul network, handoff information for the wireless station.

6. The method of claim 5 further comprising the step of:
  creating a tunnel to the certain cell site.

* * * * *

UNITED STATES PATENT AND TRADEMARK OFFICE
CERTIFICATE OF CORRECTION

PATENT NO. : 7,483,706 B2  Page 1 of 1
APPLICATION NO. : 11/593359
DATED : January 27, 2009
INVENTOR(S) : Farley et al.

It is certified that error appears in the above-identified patent and that said Letters Patent is hereby corrected as shown below:

ON THE TITLE PAGE

Item (56), OTHER PUBLICATIONS, page 2, right column, line 16, after "(Feb. 1996)", delete "XP0000554691." And insert therefor --XP000554691.--.

Item (57), ABSTRACT, page 1, right column, line 2, before the words "receiving data" delete "receiving,".

At column 4, line 33, after the word "migrate" delete "7".

At column 5, line 6, before the words "the server" delete "(step 301," and insert therefor --(step 301),--.

At column 5, line 32, after the word "for" delete "transmissions" and insert therefor --transmission--.

Signed and Sealed this

Twenty-sixth Day of May, 2009

JOHN DOLL
*Acting Director of the United States Patent and Trademark Office*